Jan. 29, 1974  G. D. LEE  3,788,937

STRUCTURAL ACOUSTIC TRANSMISSION MATERIAL

Filed July 19, 1971  2 Sheets-Sheet 1

INVENTOR.
GEORGE DICK LEE
BY
Fraser and Bogucki
ATTORNEYS

United States Patent Office 3,788,937
Patented Jan. 29, 1974

3,788,937
STRUCTURAL ACOUSTIC TRANSMISSION
MATERIAL
George Dick Lee, Monterey Park, Calif.,
assignor to Hitco
Filed July 19, 1971, Ser. No. 163,788
Int. Cl. B32b 5/22, 19/02
U.S. Cl. 161—158                                    10 Claims

ABSTRACT OF THE DISCLOSURE

A structural material having excellent acoustic transmission properties comprises a partially elastomeric, low density panel of composite construction. In one example a number of layers of a lightweight synthetic fabric define a transmission panel of appreciable thickness and include approximately 50% by weight of a resin matrix mixture which is of approximately 50% elastomeric material. Preferably also, the matrix material incorporates approximately 10% by weight of thin wall glass microspheres. Further increases in structural properties may be obtained, without undue sacrifice of transmission properties, by incorporating thin inner and outer shells joined to the multi-layer composite core.

BACKGROUND OF THE INVENTION

This invention relates to acoustic panel structures having good acoustic transmission properties, and particularly to lightweight, unsupported acoustic transmission panels that may be readily fabricated in large and complex shapes.

A number of electronics and other systems utilize panel materials that are required to have good structural properties as well as good acoustic transmission properties. Sonic depth finder, communication, and similar equipment utilize sonar panels, often in the form of shells or domes, to protect transducers while transmitting the acoustic wave energy with minimum loss. The structures should not only be self-supporting, but also must be able to withstand substantial differential pressure, wave action and impinging forces normally encountered in use. The term "acoustic transmission" is to be distinguished from the general term "acoustic" used in other contexts, such as for absorption, reflection or attenuation.

Heretofore, it has been difficult to provide structures that provide the desired combination of superior acoustical and structural properties, particularly as to large structures of a few to many feet in length. A rigid, stiff material is excessively responsive to mechanical vibration and thus introduces noise into the acoustic system. Rubber reinforced structures have been used but these must be pressurized internally to retain shape. Thin metal shells have also been used, but in large area devices many segments must be joined together and a reinforcing structure provided.

The properties required of a good acoustical panel include low insertion loss with respect to the operative acoustic device, and good damping properties with respect to external vibrations, without sacrifice of self-supporting characteristics. The most significant values are in terms of critical damping, conventionally given in percent (percent $C/C_c$) as a measure of the rate of decay of resonant vibration, and strength and various modulus values. Rubber, for example, has excellent damping characteristics (typically about 5%) but very low modulus values. The shear modulus of rubber is so low that deflection and instabilities arise in the structure. Therefore rubber structures are stiffened by wire mesh to be self-supporting, which in turn increases transmission loss and complicates fabrication. Thin shell composites, such as glass fiber reinforced bodies, have very low damping (less than 1%) and significant transmission loss, although they have high modulus values. Whatever structure is used should have good resistance to environmental effects, as encountered in underwater usage. The modulus of elasticity, Poisson's ratio and density of the material have an interrelated effect on sound velocity, and must meet particular criteria. In addition, the panel should be manufacturable without expensive or difficult hand or precision operations, whether made in simple or complex shapes.

It is known, as taught in Pats. Nos. 2,956,281 and 3,079,289 to provide panel structures for electromagnetic wave systems, i.e., radar and similar systems, by incorporating expanded particles in the form of beads or microspheres in a retaining structure so as to provide a desired dielectric constant. Typically, a honeycomb or other cellular structure is used between inner and outer sheets of material, with the matching cellular material being utilized to minimize discontinuity between the shells and the interior filler, so as to maintain a substantially uniform dielectric constant and minimize reflections at the interfaces. The techiques and structures disclosed in these patents, however, are not suitable for acoustic transmission, or for the modulus, damping and shock requirements imposed on water-borne vehicles.

SUMMARY OF THE INVENTION

Acoustic wave transmission panels in accordance with the invention comprise relatively thick, shape retaining but slightly resilient multi-layered composites of light synthetic fabric, adhered together in a unifying resin matrix material that comprises less than 50% by weight of the total structure and includes approximately 50% by weight of elastomer. The matrix itself may include in excess of 10% by weight of a thin wall glass microsphere material. A panel of this form may be used with or without thin covering sheets of greater strength but of lesser acoustic properties, so as to enhance structural characteristics at no significant sacrifice of acoustic properties. While having structural integrity and adequate compressive and shear strength to be self-supporting under demanding operative conditions, and while having good critical damping, the panels are also characterized by low density, low Poisson's ratio and proper modulus of elasticity, factors which combine to give excellent acoustic transmission properties.

In a preferred example of a panel in accordance with the invention, a structural panel for acoustic applications comprises a plurality of layers of synthetic fabric material, laid up in pre-impregnated form to form a thick core, typically although not necessarily in excess of 1 inch in thickness. The panel is made up of between 50% and 60% by weight of fabric relative to the resin mix, which itself comprises approximately 14% by weight of thin wall glass microspheres. Preferably, the synthetic fabric comprises a woven polyester reinforcement, with each ply being of approximately .025 to .030 inch in thickness, with the inner and outer faces of the core material being joined to relatively thin but strong surface panels of glass fiber reinforced plastic. The resin mix in this example comprises a substantial portion, approximately 50% by weight, of elastomeric material. This panel closely matches the characteristics of sea water in terms of sound velocity and introduces very low transmission loss. Panels made in accordance with the invention are readily fabricated in complex shapes within a single shaped mold or tool, while retaining good internal properties, such as superior resin to fiber bonds, and sufficiently high reinforcement melting point characteristics to permit unification under temperature and pressure using conventional molding techniques.

BRIEF DESCRIPTION OF THE DRAWINGS

A better understanding of the invention may be had by reference to the following description, taken in conjunction with the accompanying drawings, in which.

DETAILED DESCRIPTION

Figure 1:
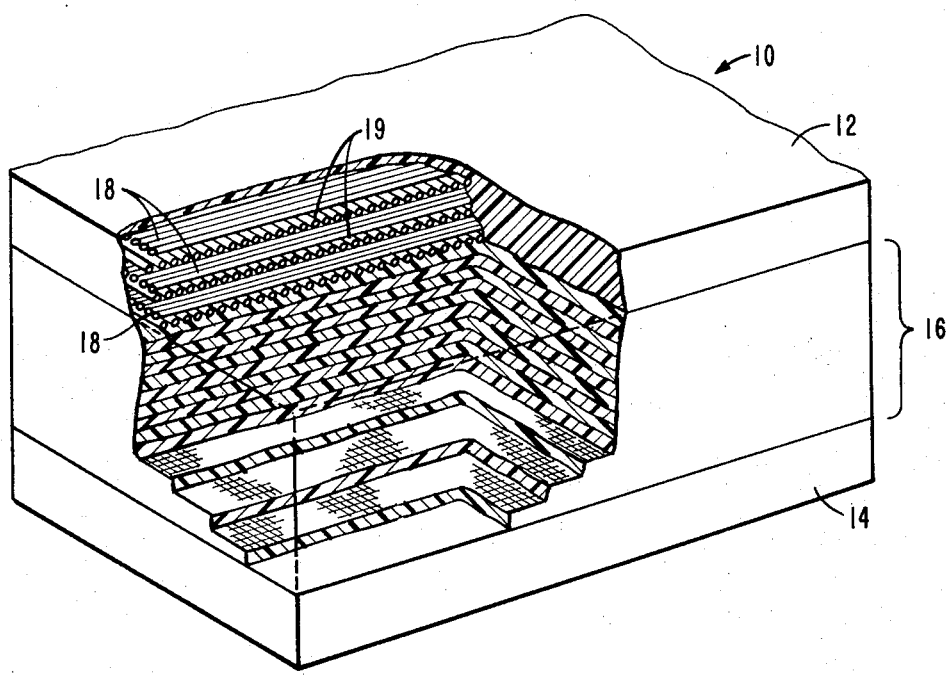
FIG. 1 is a broken away perspective view of a panel material in accordance with the invention.
Figure 2:
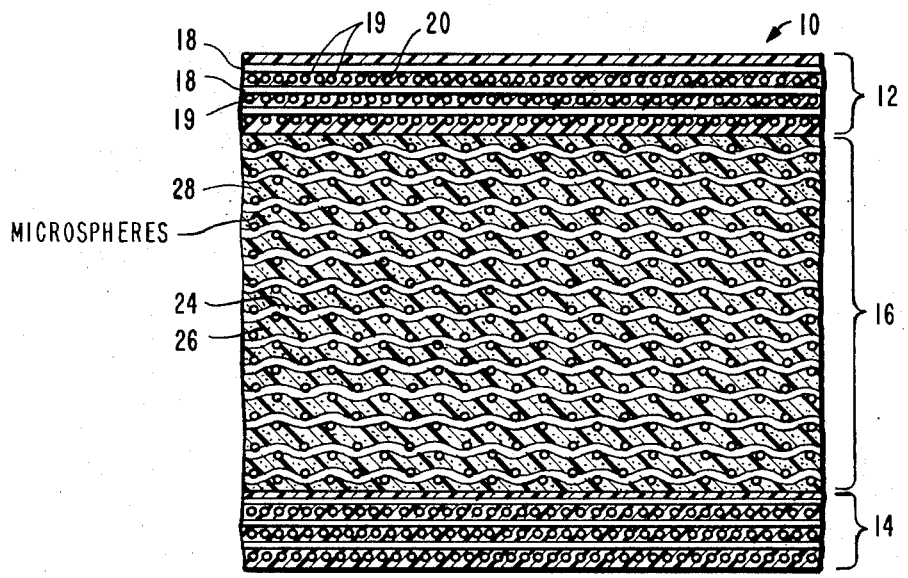
FIG. 2 is an enlarged and somewhat simplified cross-sectional view of the panel material of FIG. 1.

A panel 10 of structural acoustic transmission material is depicted in somewhat idealized form in FIGS. 1 and 2. Although a flat panel is shown for simplicity, it will be appreciated from the following that conventional layup techniques can be used to make flat, curved or complex three dimensional shapes. For example, typical dome shapes may be provided by joining equiangular sections or by fitting together separate shell sections.

As seen in FIGS. 1 and 2, the panel 10 includes outer skin panels 12, 14 which may hereinafter be referred to for convenience as the upper and lower skin panels 12, 14 respectively, and an inner core material 16 comprising a filament reinforced composite structure defined by a plurality of fabric layers within a matrix. The skin panels 12, 14 are utilized for strength in the specific example being described, but the core material 16 alone can be sufficiently strong and rigid for many acoustical applications. In the present example, the total thickness of the panel is approximately 2 inches, and the skin panels 12, 14, are each of approximately 0.24 inch thickness, with the core material being approximately 1.52 inches thick.

The skin panels 12, 14, as illustrated for the upper panel 12 in FIG. 1, each comprise a relatively high strength filament reinforced composite, in this specific example including a number of layers of unidirectional glass filaments arranged in cross-ply fashion. Longitudinal and transverse filament layers 18, 19 respectively are disposed in a resin matrix 20.

The core 16, on the other hand, comprises a plurality of layers of synthetic fabric 24 disposed in a unified resin matrix 26, a substantial portion of which by volume includes a lightweight filler, e.g., thin wall glass microspheres 28. It will be appreciated that the relative dimensions of the fabrics and the impregnant matrix through which they are distributed, and the microspheres, cannot be depicted to scale with clarity. Thus the representations of FIGS. 1 and 2 are idealized and certain portions exaggerated for clarity. In the present example the skin panel layers are approximately 0.010 inch thick, and the core layers approximately 0.025 inch thick. It is desirable that the matrix incorporate a substantial amount, here approximately 50% by weight, of elastomeric material. Typical methods of fabricating multi-layer laminates may be utilized, it being preferred in this instance to coat the synthetic fabric 24 with the desired resin mix to a given proportion or ratio, the resin mix being between 40% and 50% of the total weight of fabric and resin. Specifically, it is preferred that the resin be between 42% and 48% by weight, so that the fabric is between 58% and 52% by weight of the composite product. The resin mix is applied to the individual fabric layers by typical impregnating techniques, providing a partially cured material having a tacky surface. Thereafter, the multiple layers of the core 16 and the skin 12, 14 are laid up in a single piece mold having the desired final configuration and to the desired thickness, and unified under temperature and pressure by conventional processes to the fully cured body conforming to the shape of the mold.

Figure 3:
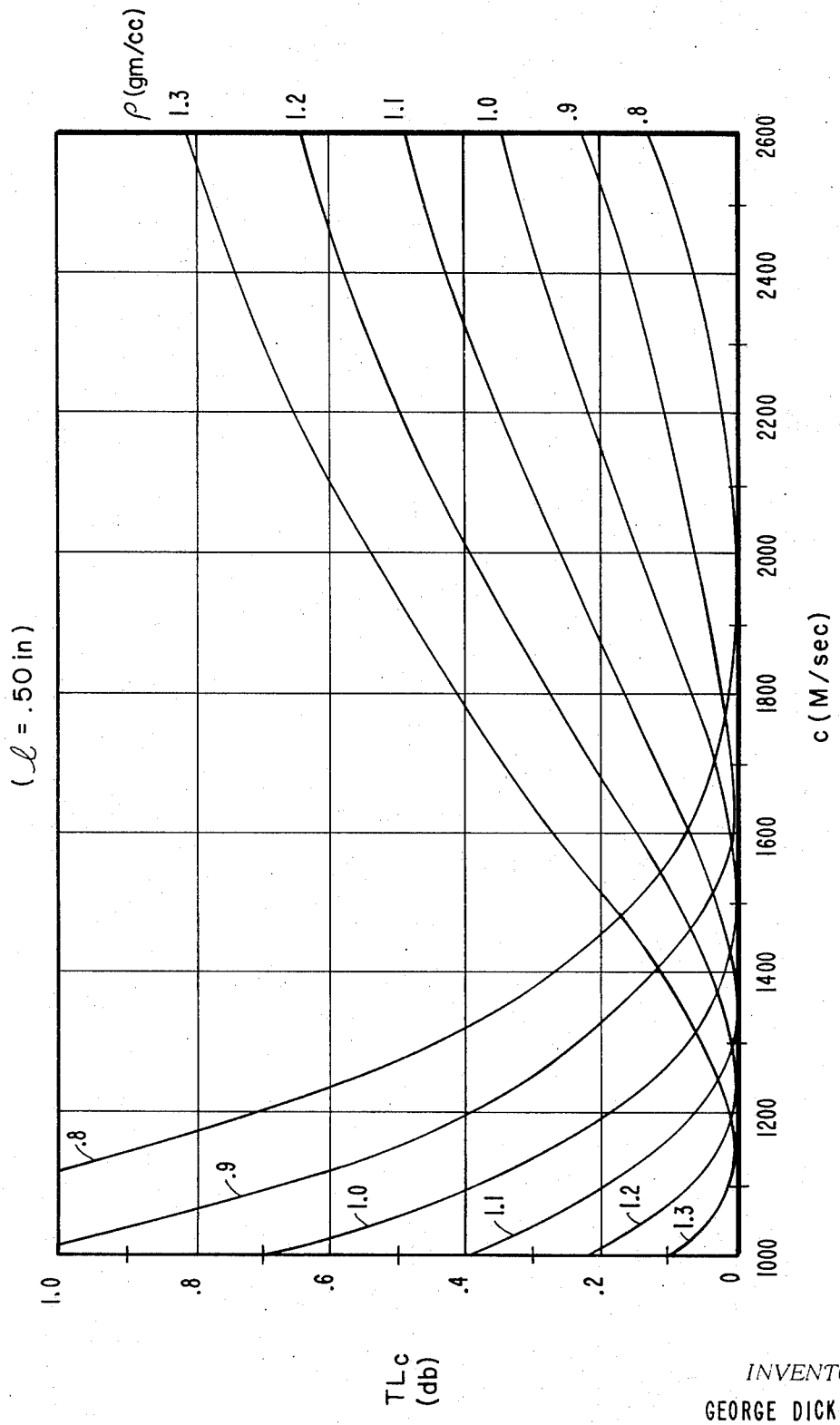
FIG. 3 is a graphical representation of density vs. sound velocity vs. transmission loss for acoustic structures in accordance with the invention.

Structures in accordance with the invention have selectable acoustical characteristics, i.e., transmission loss (TL$_c$) measured in decibels for given conditions of density ($\rho$) with relationship to sound velocity, as depicted in FIG. 3. In the present example, a density of approximately 1.0 to 1.05 (g./cc.) is provided, and it can be seen from FIG. 3 that at a sound velocity of approximately 1550 to 1600 meters per second, a typical value for ambient sea water, the transmission loss for such densities is virtually zero. Consequently, the material provides an almost perfect match to sea water.

The sound velocity of the material itself is determined by its density, which must be low, its Poisson's ratio, which must also be low, and its modulus values, which must be in the range of 250,000 to 400,000 p.s.i. The interrelationship of these factors, as well as other factors discussed herein such as critical damping, are well known to those skilled in the art and therefore are not discussed in detail for brevity. The critical damping is found to be typically approximately 2.5% in the frequency range of interest. This is substantially better than the majority of other acoustic transmission materials. Although sound velocity varies with temperature, the acoustic transmission characteristic is sufficiently broadbanded in nature to limit undesired losses with normal variations.

The desirable acoustical and damping properties are little affected by the thin higher strength skin panels 12, 14. The major mechanical and structural forces encountered result from pressure differentials between the interior and exterior, and any particular requirements that may be imposed by such factors as wave slap and underwater shock. Structures in accordance with the invention have had the following typical characteristics.

| Property: | Typical value |
|---|---|
| Tensile strength, warp, p.s.i. | 15,900 |
| Tensile modulus, warp, p.s.i. | 327,000 |
| Tensile strength, fill, p.s.i. | 13,600 |
| Tensile modulus, fill, p.s.i. | 240,000 |
| Flexure strength, warp, p.s.i. | 9,710 |
| Flexure modulus, warp, p.s.i. | 401,000 |
| Flexure strength, fill, p.s.i. | 6,670 |
| Flexure modulus, fill, p.s.i. | 255,000 |
| Shear strength, warp, p.s.i. | 869 |
| Shear modulus, warp, p.s.i. | 30,800 |
| Shear strength, fill, p.s.i. | 940 |
| Shear modulus, fill, p.s.i. | 36,500 |
| Compressive strength, warp, p.s.i. | 6,180 |
| Compressive modulus, warp, p.s.i. | 302,000 |
| Compressive strength, fill, p.s.i. | 3,900 |
| Compressive modulus, fill, p.s.i. | 386,000 |
| Flatwise tensile strength, p.s.i. | 1,100 |
| Laminate specific gravity | [1] 1.00 |
| Thickness per ply, inch | 0.025 |
| Poisson's ratio | 0.15 |

[1] Max. 1.05.

Good structural and good acoustical transmission properties do not appear feasible in a single material system. Structures in accordance with the invention, however, do exhibit suitable combinations of such properties. The core material, which accounts for approximately 80% or more of the body, dissipates the energy of flexural vibration to provide good damping while at the same time preventing the relatively thin skin layers from buckling. Also, the composite structure has a sound velocity closely matching that of the water environment (sea water in these exmaples). The Poisson's ratio is in a range (from 0.1 to 0.22) where sound velocity is not greatly affected by variations in this property. The shear modulus is nevertheless in a range in which the structure is relatively free from deflections and instabilities. Rubber, for example, has a Poisson's ratio of 0.4 to 0.5, but has virtually zero shear modulus. Transmission losses through the system of less than 0.10 db have been calculated, based upon losses through an approximately 2" panel in acoustic energy from a transducer proximate to the panel. In addition, the systems have the important advantage that they can be laid up in a single part mold and fabricated reliably by conventional techniques.

EXAMPLE I

The following example of an approximately 2 inch thick panel having skin panels and a multi-ply laminate core incorporating thin wall glass microspheres is provided as the specific example of the material having the above properties. This panel has virtually zero db acoustic transmission loss at the nominal sound velocity of sea water, together with adequate structural strength for underwater vehicle use, and is readily manufactured in complex shapes. The skin panels comprise resin impregnated cross-ply layers of the type sold under the trademark "Scotchply" by the 3M Company of St. Paul, Minn. The individual fabric reinforcements in the core comprise woven polyester reinforcement, type 57014 fabric made of type 68 Dacron yarn made by Burlington Industries. The core material density is between 1.0 and 1.05, with the resin matrix comprising the following constituents, in parts by weight, accurate to ±5%.

| | |
|---|---|
| Epon 828 epoxy resin | 100 |
| DEN 438 epoxy-novolac resin | 200 |
| BF3-MEA curing agent | 9 |
| Hycar CT3NX liquid elastomer | 112 |
| Hycar 1472 nitrile rubber | 224 |
| B40A glass mcrospheres | 128 |
| Z6040 epoxy-silane finish | 16 |

The specific formulation given above provides a superior bond between the reinforcing fabric and the resin mix, and also, because of the relatively higher melting point of Dacron (polyester material of Du Pont) than other synthetic fabrics, provides ag reater tolerance between the melting point of the fabric and the molding temperature.

EXAMPLE II

A panel having the same thickness as the panel of Example I was fabricated in which the skin panels were of glass fabric, in an epoxy-nitrile rubber matrix. The resin mix was as previously described, but the fabric reinforcement comprised a fabric made of polypropylene yarn. This panel appears to have a virtual minimum of acoustic transmission loss, at some sacrifice of strength and ease of fabrication relative to the polyester fabric.

Preferred systems in accordance with the invention are achieved by matrix formulations in accordance with the following ranges, and may be obtained from the sources noted.

| | Range—Parts by wt. |
|---|---|
| Epoxy resin, Epon 828—Shell Chemical Co. | 100–200 |
| Epoxy-novolac resin, DEN 438—Dow Chemical Co. | 200–240 |
| Curing agents, BF3-MEA—General Chemical Co. | 9–36 |
| Liquid elastomer, Hycar CTBNX—B. F. Goodrich Chemical Co. | 100–120 |
| Nitrile rubber, Hycar 1472—B. F. Goodrich Chemical Co. | 200–240 |
| Thin wall glass microspheres, B40 A Minnesota Mining & Mfg. Co. | 60–130 |
| Epoxy-silane finishing material, Z6040 Dow Corning | 7–16 |

Although various acoustic transmission structures in accordance with the invention have been described, it will be appreciated that other variations and modifications can be made within the scope of the appended claims.

What is claimed is:

1. An acoustical structural panel comprising a plurality of layers of synthetic fabric in a resin matrix, the resin matrix including elastomeric material and thin wall glass microspheres, the panel forming a unified, thick walled, resilient, self-supporting structure and having a Poisson's ratio in the range of 0.1 to 0.22, the resin matrix comprising 40–50% by weight of the total weight of the fabric and matrix, the elastomeric material comprising 30–50% by weight of the resin matrix and the thin walled glass micropheres comprising at least 10% by weight of the resin matrix.

2. An acoustical structural panel comprising a plurality of layers of synthetic fabric in a resin matrix, the matrix comprising 40–50% by weight of the total weight of the fabric and matrix and including a resin, an elastomeric material comprising 30–50% by weight of the matrix and a plurality of glass microspheres comprising 5–15% by weight of the matrix, the panel having a Poisson's ratio in the range of 0.1 to 0.22 and a density of 1.00 to 1.05.

3. The invention as set forth in claim 2, wherein the panel has a critical damping value on the order of 2.5% and a modulus of elasticity in the range of 250,000 to 400,000 p.s.i.

4. The invention as set forth in claim 2, including in addition a pair of skin panel members on opposite sides of and joined to the panel.

5. The invention as set forth in claim 4, wherein the skin panel members are of glass fiber reinforced plastic and each comprises less than approximately 20% of the thickness of the panel.

6. The invention as set forth in claim 5, wherein the skin panel members each comprise a plurality of layers of unidirectional filament material disposed in cross-ply fashion.

7. The invention as set forth in claim 2, wherein the synthetic fabric comprises woven polyester fabric.

8. The invention as set forth in claim 2, wherein the synthetic fabric comprises woven polypropylene material.

9. The invention as set forth in claim 2, wherein the matrix comprises approximately 100 parts by weight of epoxy resin, approximately 200 parts by weight of epoxy-novolac resin, approximately 112 parts by weight of liquid elastomer, approximately 224 parts by weight of nitrile rubber, and approximately 128 parts by weight of thin wall glass microspheres.

10. The invention as set forth in claim 2, wherein the matrix comprises 100–200 parts by weight of epoxy resin, 200–240 parts by weight of epoxy-novolac resin, 100–120 parts by weight of liquid elastomer, 200–240 parts by weight of nitrile rubber, and 60–130 parts by weight of glass microspheres and including in addition minor parts by weight of curing agent and finishing material.

References Cited

UNITED STATES PATENTS

| | | | |
|---|---|---|---|
| 3,316,139 | 4/1967 | Alford et al. | 161—72 |
| 3,544,418 | 12/1970 | Holtzman | 161—94 X |
| 3,046,172 | 7/1962 | Reid | 161—160 |
| 3,632,703 | 1/1972 | Sullivan et al. | 181—33 G |
| 2,806,509 | 9/1957 | Bozzacco et al. | 161—DIG. 5 |
| 3,079,289 | 2/1963 | George, Jr. et al. | 161—DIG. 5 |
| 3,567,568 | 3/1971 | Decker | 161—161 |
| 3,515,625 | 6/1970 | Sedlak et al. | 161—168 |
| 3,197,352 | 7/1965 | Coates | 161—DIG. 4 |
| 3,698,980 | 10/1972 | Addison | 161—92 |

GEORGE F. LESMES, Primary Examiner

P. J. THIBODEAU, Assistant Examiner

U.S. Cl. X.R.

161—41, 92, 159, 162, 168, DIG. 5; 181—33 G

UNITED STATES PATENT OFFICE
CERTIFICATE OF CORRECTION

Patent No. 3,788,937        Dated January 29, 1974

Inventor(s) George Dick Lee

It is certified that error appears in the above-identified patent and that said Letters Patent are hereby corrected as shown below:

Column 1, line 20, after "of" and before "transmis-" insert --acoustic--. Column 3, line 49, "impregnant" read --impregnated--; line 51, after "0.010" and before "thick", "inch" read --inches--; line 52, after "0.025" and before "thick", "inch" read --inches--. Column 4, line 2, after "1.05" and before "is", "(g./cc.)" read --(g/cc)--; line 11, after "400,000" and before "The", "p.s.i." read --psi--; line 29, after "characteristics" the period (".") should be a colon --:--; line 30, after "Property" strike the colon (":"); line 30, "Property    Typical value" read --Property Typical Value--; line 49, after "ply", "inch" read --inches--. Column 5, line 25, "mcrospheres" read --microspheres--; line 32, "ag reater" read --a greater--; line 48, after "note" strike the period ("."); line 49, for "Range--Parts by wt." read --Range - Parts by Wt.--; line 53, for "agents" read --agent--.

Signed and sealed this 8th day of October 1974.

(SEAL)
Attest:

McCOY M. GIBSON JR.
Attesting Officer

C. MARSHALL DANN
Commissioner of Patents